July 10, 1951 W. AMES 2,559,912
THICKNESS GAUGE FOR COMPRESSIBLE MATERIAL
Filed Jan. 13, 1948 3 Sheets-Sheet 1
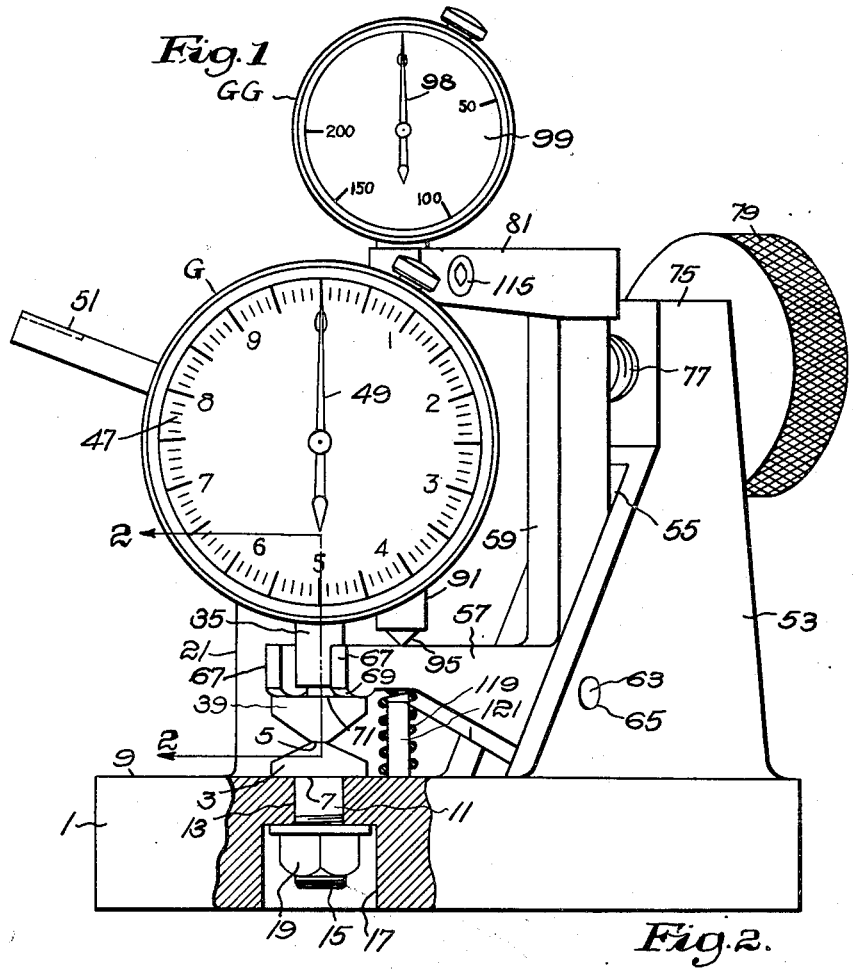
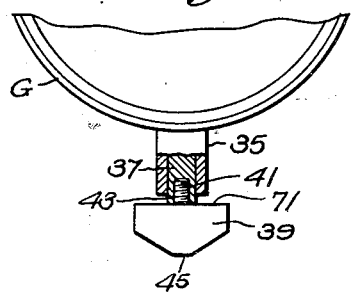
Inventor:
Warren Ames July 10, 1951  W. AMES  2,559,912
THICKNESS GAUGE FOR COMPRESSIBLE MATERIAL
Filed Jan. 13, 1948  3 Sheets-Sheet 2
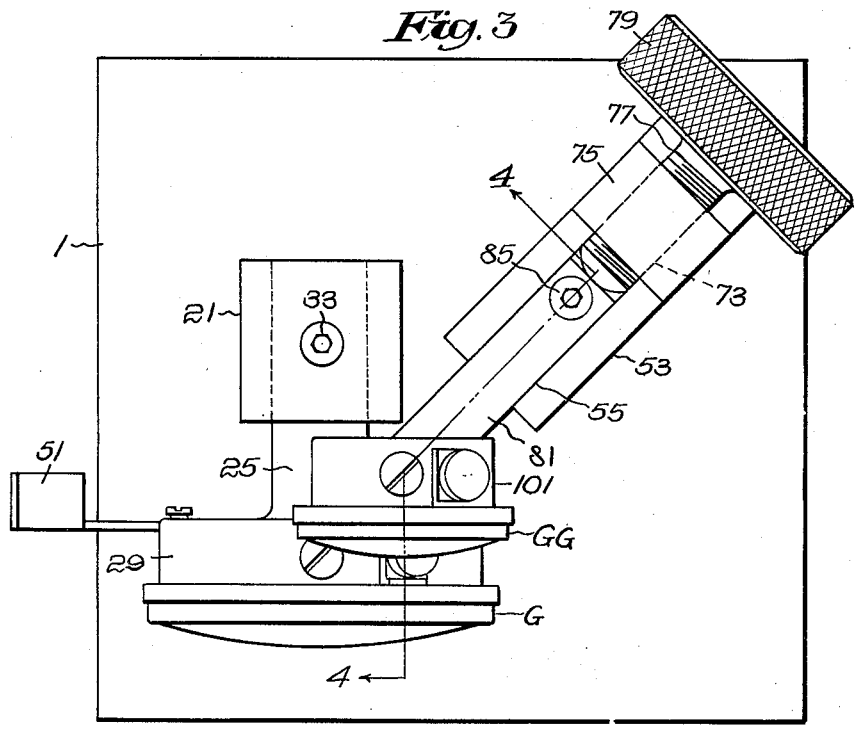
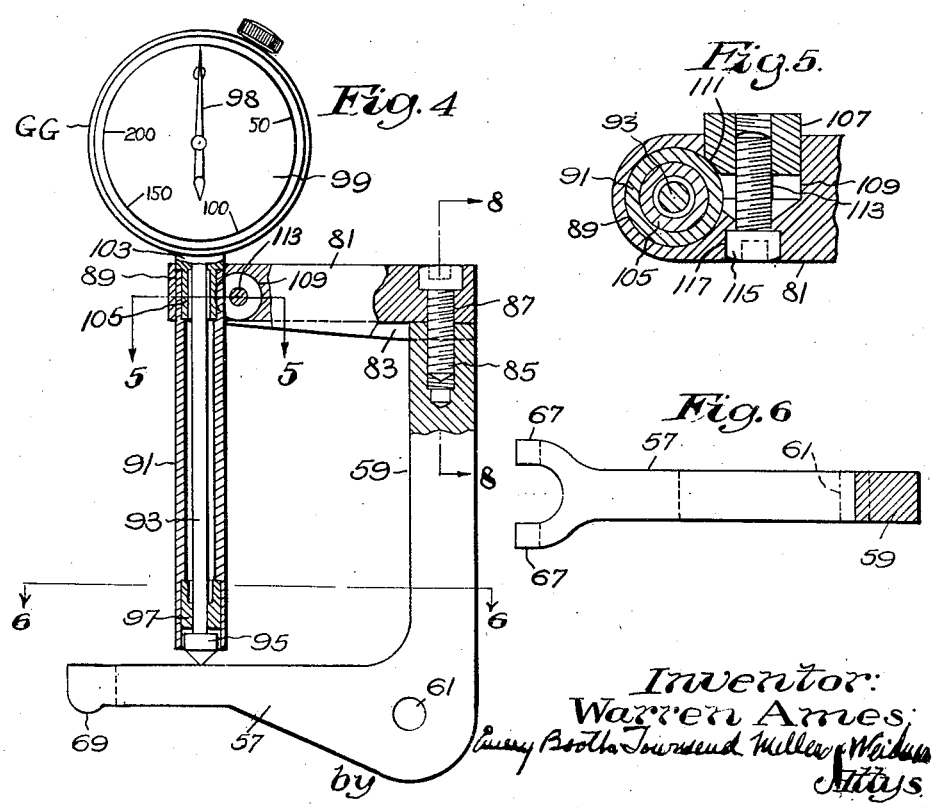
Inventor:
Warren Ames July 10, 1951 W. AMES 2,559,912
THICKNESS GAUGE FOR COMPRESSIBLE MATERIAL
Filed Jan. 13, 1948 3 Sheets-Sheet 3

Inventor:
Warren Ames
by Emery Booth Townsend Miller & Weidner
Attys

UNITED STATES PATENT OFFICE 2,559,912

THICKNESS GAUGE FOR COMPRESSIBLE MATERIAL

Warren Ames, Newton, Mass., assignor to B. C. Ames Co., Waltham, Mass., a corporation of Massachusetts Application January 13, 1948, Serial No. 1,969

4 Claims. (Cl. 33—147)

My invention relates to thickness gauges, for compressible material such as paper for example, having provision for placing the material under pressure and measuring its thickness while in such condition so as to indicate its compressibility.

The invention will be best understood from the following description when read in the light of the accompanying drawings of a specific embodiment of the invention selected for illustrative purposes, while the scope of the invention will be more particularly pointed out in the appended claims.

In the drawings—

Fig. 1 is an elevation of a gauge according to the invention, with parts in section;

Fig. 2 is a section on the line 2—2 of Fig. 1, with parts in elevation and parts omitted;

Fig. 3 is a plan of the gauge according to Fig. 1;

Fig. 4 is a section on the line 4—4 of Fig. 3 of the pressure applying member and associated pressure indicating gauge according to Figs. 1 and 3, with parts in elevation;

Figure 7:
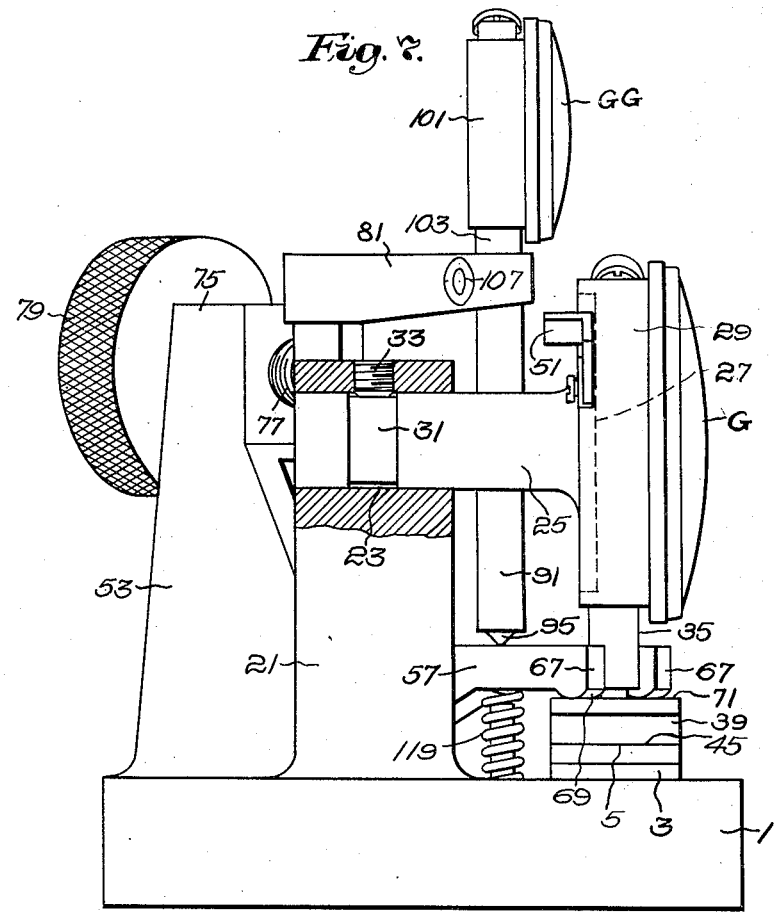
Figure 8:
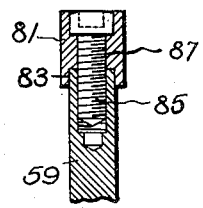

Figs. 5 and 6 are, respectively, sections on the lines 5—5 and 6—6 of Fig. 4, with parts omitted, Fig. 5 being on an enlarged scale;

Fig. 7 is an elevation of the gauge according to Figs. 1 to 6 as viewed from the right of Fig. 3, with parts in section; and Fig. 8 is a section on the line 8—8 of Fig. 4.

Referring to the drawings, the thickness gauge illustrated comprises a base 1 adapted to rest upon a table top or similar support. Carried by this base is an anvil 3 which, as shown, is formed to provide an upper surface 5 upon which the work is adapted to rest, such surface being, for example, but without limitation thereto, a rectangle about ⅛ inch wide and about one inch long. The under surface 7 of the anvil, as shown, rests upon the upper surface 9 of the base. Formed integrally with the anvil is a shank 11 (Fig. 1) which extends through an opening 13 in the base and has a screw-threaded end portion 15 projecting into a recess 17 opening on the under side of the base. Screw-threaded on the shank is a nut 19 which serves to clamp the anvil securely to the base.

As shown, extending upwardly from the base 1, and formed integrally therewith, is a post 21 having a horizontal opening 23 (Fig. 7) which receives one end portion of a horizontal cylindrical arm 25, the latter at its opposite end being formed integrally with the back plate 27 of the casing 29 of an indicating gauge G, so that the gauge is rigidly carried by the arm. As shown, the portion of the arm received in the opening 23 is formed with a circumferential groove 31 which receives the projecting end of a set screw 33 carried at the upper end of the post 21, the set screw serving to secure the arm fixedly to the post.

The casing 29 of the indicating gauge G is shown as provided with a downwardly projecting sleeve 35 through which reciprocally extends the gauge contact feeler rod 37 (Fig. 2). At its lower projecting end this rod carries a work contact feeler 39 having at its upper side a shank 41 screw-threaded into an opening 43 in the lower end of the contact feeler rod. The contact feeler 39 at its lower side is formed to present a work contacting surface 45, preferably of the same size and shape as the upper surface 5 of the anvil 3. By loosening the set screw 33 the arm 25 carrying the indicating gauge G may be rotated and moved horizontally relative to the post 21 to cause the surfaces 45 and 5 to be brought into exact registering contact when the parts are in the position shown by Fig. 1, after which the set screw may be tightened.

The indicating gauge G, which as shown is of the dial micrometer type, may be of common construction, and therefore need not be described with any more particularity than necessary to show how it coacts with the other features of the instrument constituting the present invention. As illustrated, this indicating gauge comprises a graduated dial 47, preferably calibrated into ten thousandths of an inch, with which dial cooperates a movable indicator hand 49. As will be understood by those skilled in the art, vertical movement of the contact feeler rod 37 carrying the contact feeler 39 will cause movement of the indicator hand, so that the latter will indicate the distance the work contacting surface of the contact feeler is separated from the corresponding work contacting surface of the anvil 3, and in this way cause the gauge to indicate the thickness of the work positioned between those two surfaces. As is common with gauges of this type, the contact feeler rod is pressed outwardly by a spring carried internally of the gauge mechanism so as to cause the contact feeler to bear against the work under a very slight pressure, a finger lever 51 being provided for raising the contact feeler rod and attached contact feeler to permit the work to be placed between the latter and the anvil, whereupon release of the finger lever will cause the contact feeler to move against the work resting upon the anvil.

As illustrated, formed integrally with the base 1 is a second vertically extending post 53 formed with a slot 55 in which is received a bell crank lever having the horizontally extending leg 57 and vertically extending leg 59. This bell crank lever is formed with a perforation 61 (Fig. 4) through which extends a pivot pin 63 (Fig. 1) upon which the bell crank lever is swingingly mounted, the end portions of which pin have driving fits in openings 65 in the post 53 at the opposite sides of the bell crank lever.

The outer end of the horizontally extending leg 57 of the bell crank lever is shown as bifurcated to form portions 67 embracing the sleeve 35 of the indicating gauge G. Each of these portions is provided at its under side with a rounded surface 69 which rockably rests upon the upper surface 71 of the contact feeler 39. Screw-threadedly received in a perforation 73 in the head 75 of the post 53 is a screw 77 having the rather large diameter knurled head 79, the outer end of this screw bearing against the adjacent side of the vertically extending leg 59 of the bell crank lever, so that by turning the screw the free end of the leg 57 of the bell crank lever may be caused to press on the contact feeler 39 to exert a compressive force on the work.

The bell crank lever is formed of highly resilient material such as tempered steel. The vertically extending leg 59 of the bell crank lever may, for example, but without limitation thereto, be about 3/8 x 1/2 inch in cross-section, as viewed in Fig. 6, and about 2.6 inches long as measured upwardly from the upper surface of the leg 57 of the bell crank lever as viewed in Fig. 4, with the screw 77 adapted to bear against the leg 59 at a point about 2.2 inches above said upper surface of the leg 57, these dimensions being approximately those shown in the accompanying application drawings, while the leg 57 may be of similar stout construction. Despite the stout construction of the bell crank lever, the pressure of the screw 77 on the bell crank lever, when the work is positioned between the anvil and the contact feeler, causes a minute but measurable distortion in the bell crank lever, and in the present invention that distortion is employed to indicate such pressure.

As shown, the leg 59 of the bell crank lever at its upper end carries an arm 81, the arm being grooved at its under side, as indicated at 83 (Figs. 4 and 8), snugly to receive said end of the leg and thus prevent relative rotation of the two. A screw 85 tapped into the leg and extending through the perforation 87 in the arm serves to attach the latter fixedly to the leg. At its outer end the arm is shown as formed with a perforation 89 through which extends a sleeve 91 rigidly carrying an indicating gauge GG of the dial micrometer type. The contact feeler rod 93 of this gauge extends through the sleeve, and at its lower end carries a contact feeler 95 bearing against the upper surface of the leg 57 of the bell crank lever, the sleeve 91 at its lower end being provided with a guide bushing 97 for the contact feeler rod, to which latter the contact feeler is secured in the same manner as the contact feeler 39 is secured to the contact feeler rod 37.

The indicating gauge GG may be of the usual construction of dial micrometer gauges in which the contact feeler rod 93 is urged outwardly under slight pressure by a spring contained within the gauge casing and forming part of the gauge mechanism, which in this case causes the contact feeler 95 at all times to bear against the upper surface of the leg 57 of the bell crank lever. Consequently, when the bell crank lever is distorted as above described, the movable indicator hand 98 of the gauge will indicate such distortion. As such distortion is a function of the pressure exerted by the bell crank lever on the contact feeler 39, the dial 99 of the indicating gauge GG may be empirically calibrated in pounds to cause its indicator hand to indicate the pressure in pounds exerted by the contact feeler 39 on the work under the influence of the screw 77. Conveniently this dial may be calibrated by pivotally mounting the bell crank lever and gauge assembly shown by Fig. 4 on a frame having a screw similar to the screw 77 for exerting pressure on the leg 59, and with the rounded surfaces 69 of the leg 57 operatively resting upon the platform of a platform scales, with the result that the reading of this scales when the screw is caused to exert pressure on the leg 59 will be correspondingly indicated by the position of the indicator hand 98 of the gauge.

Conveniently, the indicating gauge GG is of the usual construction in which the casing 101 (Fig. 7) thereof is integrally formed with a sleeve 103 through which the contact feeler rod 93 (Fig. 4) extends, this sleeve, in the present embodiment of the invention, at its outer end portion being reduced in diameter as indicated at 105 (Fig. 4), while the sleeve 91 preferably has a press fit over this reduced diameter portion. In the present embodiment of the invention the sleeve 91 is secured to the arm 81 by a clamping nut or member 107 slidably received in a recess 109 in the arm, this member having a beveled portion 111 bearing against the side of the sleeve. A screw 113 tapped into the member 107, and having a head 115 received in the recess 117 at the side of the arm 81 opposite the recess 109, serves to draw this member into clamping engagement with the sleeve 91.

For counteracting the weight of the bell crank lever and indicating gauge GG and other parts carried by said lever there is preferably employed a compression spring 119 slidably fitted over a post 121 rigidly carried by and projecting upwardly from the base 1, the spring at its lower end bearing against the latter and at its upper end bearing against the under side of the leg 57 of the bell crank lever. Preferably, the strength of the spring is such as to force the bell crank lever lightly against the end of the screw 77 when the latter is backed off, and thus the bell crank lever and parts carried by it are prevented from affecting the reading of the indicating gauge G under such condition of the screw.

In operating the thickness gauge according to the invention the screw 77 is backed off and the finger lever 51 depressed to raise the contact feeler 39, whereupon the work, such as a piece of a sheet of paper, may be placed upon the anvil and the finger lever released to cause this contact feeler to contact with the work, whereupon the indicating gauge G will indicate the thickness of the work. The screw 77 may then be caused, by turning the knurled head 79, to press against the leg 59 of the bell crank lever to cause the indicator hand 98 of the indicating gauge GG to indicate a predetermined pressure, say 50 pounds, whereupon the indicating gauge G will indicate the thickness of the work under such pressure. The pressure exerted by the screw 77 may then be increased by further turning the knurled head 79 to cause the indicator hand 98 of the indicating gauge GG to indicate a higher pressure, say 100 pounds, under which conditions the indicating gauge G will indicate the thickness of the work under such increased pressure. The pressure exerted by the screw 77 may then be further increased, as desired, to cause the indicating gauge G to measure the thickness of the work under increasingly greater pressures within the limits of the calibrations of the indicating gauge GG.

It will be understood that within the scope of the appended claims wide deviations may be made from the form of the invention herein described without departing from the spirit of the invention.

I claim:

1. A thickness gauge comprising a support, relatively movable members carried by said support adapted to engage opposite sides of the work, indicator mechanism carried by said support responsive to the degree of separation of said members for indicating the thickness of the work, means carried by said support comprising a resiliently distortable part adapted to urge said members relatively toward each other, a manually operated device controllable by the operator for adjustably distorting said part, and means for indicating the force applied by said distortable part for so urging said members comprising an indicating gauge having a supporting casing carried by one portion of said distortable part and a contact feeler for operating said gauge cooperating with another portion of said distortable part for causing said gauge to be responsive to that change in the distance between such portions which is caused by said manually operated device applying to said part the force which distorts it.

2. A thickness gauge comprising a support, relatively movable members carried by said support adapted to engage opposite sides of the work, indicator mechanism carried by said support responsive to the degree of separation of said members for indicating the thickness of the work, means comprising a resiliently distortable part carried by said support adapted to urge said members relatively toward each other comprising a pair of legs disposed angularly relative to each other, one of which legs is adapted to impart the force for so urging said members, adjustable force applying means under the control of the operator cooperating with the other leg, and indicating means responsive to the degree of displacement of one leg relative to the other caused by said force applying means for indicating the force by which said part so urges said members.

3. A thickness gauge comprising a support, relatively movable members carried by said support adapted to engage opposite sides of the work, indicator mechanism carried by said support responsive to the degree of separation of said members for indicating the thickness of the work, means comprising a resiliently distortable part carried by said support adapted to urge said members relatively toward each other comprising a generally U-shaped part having a base carrying a pair of spaced legs one leg of which at a portion thereof remote from the base of said part is adapted to impart the force for so urging said members, adjustable force applying means under the control of the operator cooperating with the base of said part at a portion thereof remote from such force applying leg of said part, and an indicator means responsive to the degree of separation of the legs of said part at portions of said legs remote from said base for indicating the force by which said members are so urged.

4. A thickness gauge comprising a support, an anvil carried by said support upon which the work is adapted to rest, a contact member movably carried by said support and adapted to engage the side of the work opposite that which rests upon said anvil, an indicator carried by said support operated by movement of said contact member toward and away from said anvil for indicating the thickness of the work, a resilient bell crank lever rockably carried by said support, which lever has a leg cooperating with said contact member, a manually operated screw carried by said support cooperating with the other leg of said lever for operating the latter for pressing said contact member toward said anvil, an arm carried by the leg which cooperates with said screw, and an indicator carried by said arm having a contact feeler cooperating with the other of said legs for causing said indicator to be responsive to the distance between given points on said arm and last mentioned leg whereby to cause the indicator to indicate the force by which the contact member is urged by said lever toward said anvil.

WARREN AMES.

REFERENCES CITED

The following references are of record in the file of this patent:

UNITED STATES PATENTS

| Number | Name | Date |
|---|---|---|
| 1,171,646 | Replogle | Feb. 15, 1916 |
| 1,307,775 | Hacker | June 24, 1919 |
| 1,332,570 | Ray | Mar. 2, 1920 |
| 1,539,896 | Claybourn | June 2, 1925 |
| 2,112,917 | Linn | Apr. 5, 1938 |
| 2,296,749 | Tanner | Sept. 22, 1942 |
| 2,407,648 | Boehm | Sept. 17, 1946 |
| 2,448,314 | Kavanagh | Aug. 31, 1948 |